United States Patent
Burdeniuc et al.

(10) Patent No.: US 8,445,555 B2
(45) Date of Patent: May 21, 2013

(54) STABILIZED CARBANIONS AS TRIMERIZATION CATALYSTS

(75) Inventors: Juan Jesus Burdeniuc, Colmar, PA (US); Torsten Panitzsch, Henstedt-Ulzburg (DE); John Elton Dewhurst, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 939 days.

(21) Appl. No.: 11/485,725

(22) Filed: Jul. 13, 2006

(65) Prior Publication Data

US 2008/0015274 A1  Jan. 17, 2008

(51) Int. Cl.
*C08G 18/16* (2006.01)

(52) U.S. Cl.
USPC ........... 521/125; 521/117; 521/124; 521/128; 521/129; 521/130; 521/131; 521/170; 521/174; 528/49; 528/57; 528/85

(58) Field of Classification Search
USPC ............. 521/125, 130, 131, 170, 174, 117, 521/124, 128, 129; 528/49, 57, 85
See application file for complete search history.

(56) References Cited

U.S. PATENT DOCUMENTS

| | | | |
|---|---|---|---|
| 3,586,638 A | 6/1971 | Hsieh et al. | |
| 3,609,149 A * | 9/1971 | Matsui et al. | 544/193 |
| 3,876,568 A * | 4/1975 | Wysocki | 521/170 |
| 3,892,687 A | 7/1975 | Bechara et al. | |
| 3,940,517 A | 2/1976 | DeLeon | |
| 3,954,684 A | 5/1976 | Farrissey, Jr. et al. | |
| 3,980,594 A * | 9/1976 | Fabris et al. | 521/129 |
| 3,989,651 A | 11/1976 | Lockwood et al. | |
| 4,101,530 A | 7/1978 | Burkhardt et al. | |
| 4,169,921 A * | 10/1979 | Moss et al. | 521/125 |
| 4,202,990 A | 5/1980 | Murakami et al. | |
| 4,410,641 A * | 10/1983 | Narayan et al. | 521/167 |
| 4,503,226 A | 3/1985 | Tang et al. | |
| 4,661,529 A | 4/1987 | Kuhn et al. | |
| 4,771,025 A | 9/1988 | Eling et al. | |
| 5,026,900 A * | 6/1991 | Coste et al. | 560/204 |
| 5,321,050 A | 6/1994 | Morimoto et al. | |
| 5,646,227 A | 7/1997 | Slack et al. | |
| 5,955,609 A | 9/1999 | Slack et al. | |
| 6,538,043 B1 * | 3/2003 | Bronnum et al. | 521/174 |

FOREIGN PATENT DOCUMENTS

| | | |
|---|---|---|
| EP | 1 179 556 A1 | 2/2002 |
| GB | 1 522 656 A | 8/1978 |
| JP | 2004-315695 | * 11/2004 |
| WO | 98/50345 | 11/1998 |

* cited by examiner

*Primary Examiner* — John Cooney

(74) *Attorney, Agent, or Firm* — Michael K. Boyer

(57) ABSTRACT

The present invention provides trimerization catalyst compositions having at least one carbanion compound and methods to produce a polyisocyanurate/polyurethane foam using such trimerization catalyst compositions.

30 Claims, 6 Drawing Sheets

FIGURE 1

STABILIZED CARBANIONS AS TRIMERIZATION CATALYSTS

BACKGROUND OF THE INVENTION

The present invention relates generally to catalyst systems, compositions comprising catalyst systems, polyisocyanurate/polyurethane (PIR/PUR) foam formulations, and methods of making PIR/PUR foams.

Typically, polyisocyanurate/polyurethane (PIR/PUR) foams are made by reacting a polyol and a polyisocyanate in the presence of a catalyst. Additional additives can be present. PIR/PUR foam products have excellent thermal stability and flame resistance. Isocyanurates retain their strength to temperatures of about 160° C. and are resistant to most organic solvents, acids, alkali, ultraviolet light, and humidity.

Certain carboxylate salts, such as, for example, certain alkali metal carboxylate salts, have been used as catalysts in the production of PIR/PUR foams. The use of commercially available alkali metal carboxylate salt catalysts, however, often leads to undesirable foam processing problems which are particularly significant in continuous foam operations. A distinctive "step" is observed, which is normally associated with the onset of the trimerization process, when measuring the rise speed profile of the foam, or by plotting the foam height versus time. This trimerization "step" causes a significant change in the speed of the foam rise; in essence, the foam expands at two different rates during the foaming process. In a continuous polyisocyanurate/polyurethane foam lamination operation, it is difficult to adjust the speed of the production unit to match the change in the speed of the foam rise. The result can be foam overpacking or foam back flow. This undesirable rapid rise in foam height is particularly troublesome when processing polyisocyanurate/polyurethane formulations at a high Isocyanate Index. That is, the change in the rate of foam rise is much more dramatic at a higher Isocyanate Index. Consequently, it is a technical challenge to produce desirable low flammability foam products, with a high isocyanate index, when using conventional alkali metal carboxylate salt catalysts.

As compared to alkali metal carboxylate salt catalysts, commercially available polyisocyanurate trimerization catalysts based on hydroxyalkylammonium carboxylate salts show different processability in continuous operations. They provide a smoother rate of rise profile and have a less significant trimerization "step." That is, the rate of foam rise is more consistent, even at a higher Isocyanate Index. However, hydroxyalkylammonium carboxylate salt catalysts can be unstable at temperatures above about 100° C., decomposing into volatile amine by-products. This decomposition process causes the release of volatile amines and can impart an undesirable amine odor to finished foam products. The polymerization reactions that produce PIR/PUR foam are highly exothermic, often leading to foam processing temperatures in excess of 100° C. Hence, hydroxyalkylammonium carboxylate salt catalysts can provide more predictable foam processability, but sometimes at the expense of a foam product with an undesirable amine odor.

Thus, there exists a need for a catalyst composition and a foam formulation that can offer a smooth rise profile—foam height versus time—for producing PIR/PUR foams in continuous operations. Further, there exists a need for a catalyst composition that performs well in foam formulations with a high Isocyanate Index. At the same time, such catalyst composition should provide equivalent or faster surface cure when compared to commercially available catalyst systems, such that the foam products made with the catalyst composition can have reduced surface friability and enhanced surface adherence during the manufacture of finished products such as laminated foam panels. Optionally, depending upon the selection of the catalyst components, the catalyst composition can be thermally stable at the temperatures which PIR/PUR foams normally encounter during manufacturing, and produce foams that are substantially free of volatile amines and/or amine odors. Accordingly, it is to this end that the present invention is directed to solving these needs.

BRIEF SUMMARY OF THE INVENTION

The present invention discloses a catalyst composition comprising at least one carbanion compound having the formula:

wherein:

$R^1$ and $R^2$ in each occurrence are selected independently from a hydrogen atom; a substituted or unsubstituted $C_1$-$C_{36}$ alkyl, alkenyl, aryl, or aralkyl group; an oxygen atom; —$OR^4$; or —$NHR^4$;

$R^3$ and $R^4$ in each occurrence are selected independently from a hydrogen atom or a substituted or unsubstituted $C_1$-$C_{36}$ alkyl, alkenyl, aryl, or aralkyl group;

M in each occurrence is selected independently from:
(i) an alkali metal ion,
(ii) an alkaline earth metal ion,
(iii) a zinc ion, or
(iii) a quaternary ammonium ion;

p is 1 or 2; and q is 1, 2, or 3.

In another aspect, the catalyst composition comprising at least one carbanion compound can be used in foam formulations to produce PIR/PUR foam. In yet another aspect, the present invention discloses a composition comprising the contact product of at least one active hydrogen-containing compound and a catalyst composition comprising at least one carbanion compound.

The present invention also provides a method of making a polyisocyanurate/polyurethane (PIR/PUR) foam. This method comprises contacting at least one polyisocyanate with at least one active hydrogen-containing compound in the presence of at least one blowing agent and a catalytically effective amount of a catalyst composition under conditions sufficient to produce the PIR/PUR foam, the catalyst composition comprising at least one carbanion compound having the formula:

wherein:

$R^1$ and $R^2$ in each occurrence are selected independently from a hydrogen atom; a substituted or unsubstituted $C_1$-$C_{36}$ alkyl, alkenyl, aryl, or aralkyl group; an oxygen atom; —$OR^4$; or —$NHR^4$;

$R^3$ and $R^4$ in each occurrence are selected independently from a hydrogen atom or a substituted or unsubstituted $C_1$-$C_{36}$ alkyl, alkenyl, aryl, or aralkyl group;

M in each occurrence is selected independently from:
(i) an alkali metal ion,
(ii) an alkaline earth metal ion,
(iii) a zinc ion, or
(iii) a quaternary ammonium ion;

p is 1 or 2; and q is 1, 2, or 3.

The catalyst composition of the present invention offers a substantially consistent foam height rise versus time—even at a high Isocyanate Index—and can provide an equivalent or faster surface cure during the preparation of PIR/PUR foams as compared to conventional, commercially available catalysts. In another aspect of the present invention, the catalyst composition can be thermally stable at standard foam processing temperatures, producing PIR/PUR foams which are substantially free of volatile amines and/or amine odors.

DEFINITIONS

The following definitions are provided in order to aid those skilled in the art in understanding the detailed description of the present invention.

PIR—polyisocyanurate.

PUR—polyurethane.

Isocyanate Index—The actual amount of polyisocyanate used divided by the theoretically required stoichiometric amount of polyisocyanate required to react with all the active hydrogen in the reaction mixture, multiplied by 100. Also known as (Eq NCO/Eq of active hydrogen)× 100.

pphp—parts by weight per hundred weight parts polyol.

DABCO® K15 catalyst from Air Products and Chemicals, Inc. (APCI) is a 70% solution of an alkali metal carboxylate salt, potassium 2-ethylhexanoate (also known potassium octoate), in diethylene glycol.

DABCO TMR® catalyst from APCI is a 75% solution of 2-hydroxypropyltrimethylammonium octoate in ethylene glycol Polycat® 5 catalyst from APCI is a urethane catalyst, known chemically as pentamethyldiethylenetriamine.

DETAILED DESCRIPTION OF THE INVENTION

The present invention is directed to a novel catalyst composition comprising at least one carbanion compound. This novel catalyst composition can be used as a polyisocyanate trimerization catalyst system for producing polyisocyanurate/polyurethane (PIR/PUR) foams. Further, the present invention also is directed to compositions comprising the contact product of at least one active hydrogen-containing compound and a catalyst composition comprising at least one carbanion compound. These compositions can be used together with additional components to produce PIR/PUR foams.

Also, the present invention provides a method of making a PIR/PUR foam which comprises contacting at least one polyisocyanate with at least one active hydrogen-containing compound in the presence of at least one blowing agent and a catalytically effective amount of a catalyst composition under conditions sufficient to produce the PIR/PUR foam. The catalyst composition comprises at least one carbanion compound. Additionally, rigid PIR/PUR foams can be produced with the novel catalyst system and novel compositions and foam formulations of the present invention by several methods known within the art.

In another aspect, the present invention provides a method of producing an isocyanurate which comprises contacting an isocyanate with a catalyst composition comprising at least one carbanion compound to produce the isocyanurate. Generally, any amount of the at least one carbanion compound can be used in the compositions of the present invention. As used in practice, catalyst systems for PIR/PUR foams typically include solutions of catalysts in, for example, a diluent such as ethylene glycol. When a quantity by weight of the catalyst composition of the present invention is discussed, the quantity will exclude the effect of the diluent, unless stated otherwise. As an example, if 3.6 grams of a 50% solution of potassium acetylacetonate catalyst in ethylene glycol were used in a given application, the amount of the potassium acetylacetonate catalyst would equal 1.8 grams. Hence, 1.8 grams of that catalyst component would be used in calculating any weight ratios of that component in relation to, for example, the amount of active hydrogen-containing compound or the amount of polyol.

Applicants disclose several types of ranges in the present invention. These include, but are not limited to, a range of temperatures; a range of number of atoms; a range of foam density; a range of Isocyanate Index; and a range of pphp for the blowing agent, water, surfactant, flame retardant, urethane catalyst, and catalyst composition comprising at least one carbanion compound. When Applicants disclose or claim a range of any type, Applicants' intent is to disclose or claim individually each possible number that such a range could reasonably encompass, as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that "$R^1$" can be an alkyl group having up to 36 carbon atoms, or in alternative language a $C_1$ to $C_{36}$ alkyl group, as used herein, refers to a "$R^1$" group that can be selected independently from an alkyl group having 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, or 36 carbon atoms, as well as any range between these two numbers (for example, a $C_1$ to $C_8$ alkyl group), and also including any combination of ranges between these two numbers (for example, a $C_3$ to $C_5$ and $C_7$ to $C_{18}$ alkyl group). Likewise, this applies to all other carbon ranges disclosed herein, for example, $C_1$ to $C_{36}$ ranges for $R^2$, $R^3$, and $R^4$; alkoxy groups having up to 10 carbon atoms; etc.

Similarly, another representative example follows for the parts by weight of the catalyst composition comprising at least one carbanion compound per hundred weight parts of the at least one active hydrogen-containing compound in a composition or a foam formulation. If the at least one active hydrogen-containing compound is an at least one polyol, the parts by weight per hundred weight parts polyol is abbreviated as pphp. Hence, by the disclosure that the catalyst composition comprising at least one carbanion compound is present in an amount from about 0.05 to about 15 pphp, for example, Applicants intend to recite that the pphp can be selected from about 0.05, about 0.06, about 0.07, about 0.08, about 0.09, about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, about 10, about 11, about 12, about 13, about 14, or about 15. Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

Although not required, another aspect of the present invention provides a thermally stable catalyst system. When used to describe this feature, a compound is defined as thermally stable at a given temperature when it does not decompose or release volatile amines and/or related amine odors at the given temperature. A hydroxyalkylammonium salt catalyst, such as the DABCO TMR® catalyst, can become unstable when the PIR/PUR foam temperature reaches above about 100° C. during foam processing. At these elevated temperatures, due to the nature of the quaternary amine salt, the DABCO TMR® catalyst can release volatile amine components. Catalyst compositions of the present invention which comprise quaternary ammonium ions are thermally stable if they do not have functional groups (e.g., hydroxyl) and hydrogen on the carbon atom at the β-position relative to the quaternary nitrogen.

Thus, carbanion compounds with alkali metal ions, alkaline earth metal ions, or a zinc ion are thermally stable catalyst compositions within the scope of the present invention. Quaternary ammonium ions with thermal stability include, but are not limited to, tetramethylammonium, tetraethylammonium, tetrapropylammonium, tetrabutylammonium, and the like. Such metal ions and quaternary ammonium ions can be employed individually or in any combination thereof.

In one aspect of the present invention, the catalyst composition comprising at least one carbanion compound has thermal stability up to about 150° C., wherein no or substantially no volatile amine compounds are emitted. Typical foam temperatures resulting from the exothermic reactions during the processing of PIR/PUR foam can be in the range of about 80° C. to about 150° C. In a further aspect, the catalyst system of the present invention has thermal stability up to about 160° C., about 170° C., about 180° C., about 190° C., or about 200° C.

Although not a requirement of the present invention, the catalyst compositions and formulations of the present invention can further comprise other catalytic materials or carboxylate salts in any amount. Illustrative examples of carboxylate salts include, but are not limited to, salts of acrylic acid, methacrylic acid, fumaric acid, maleic acid, formic acid, acetic acid, propionic acid, butanoic acid, butyric acid, pivalic acid, triethylacetic acid, pentanoic acid, hexanoic acid, neohexanoic acid, heptanoic acid, neoheptanoic acid, octanoic acid, neooctanoic acid, decanoic acid, neodecanoic acid, stearic acid, oleic acid, and the like, or any combination thereof.

It is also within the scope of the catalyst compositions of this invention to include mixtures or combinations of more than one carbanion compound. Additionally, the catalyst composition or other compositions and foam formulations of the present invention can also further comprise at least one urethane catalyst.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or foam formulations described herein. Combining additional components can be done by any method known to one of skill in the art.

While compositions and methods are described in terms of "comprising" various components or steps, the compositions and methods can also "consist essentially of" or "consist of" the various components or steps.

Carbanion Compound

Catalyst compositions of the present invention comprise at least one carbanion compound. The carbanion compounds are particularly useful in foam formulations for producing PIR/PUR foams. Further, catalyst compositions within the scope of the present invention can comprise at least one carbanion compound having the formula:

wherein:

$R^1$ and $R^2$ in each occurrence are selected independently from a hydrogen atom; a substituted or unsubstituted $C_1$-$C_{36}$ alkyl, alkenyl, aryl, or aralkyl group; an oxygen atom; —$OR^4$; or —$NHR^4$;

$R^3$ and $R^4$ in each occurrence are selected independently from a hydrogen atom or a substituted or unsubstituted $C_1$-$C_{36}$ alkyl, alkenyl, aryl, or aralkyl group;

M in each occurrence is selected independently from:
(i) an alkali metal ion,
(ii) an alkaline earth metal ion,
(iii) a zinc ion, or
(iii) a quaternary ammonium ion;
p is 1 or 2; and
q is 1, 2, or 3.

Unless otherwise specified, alkyl and alkenyl groups described herein are intended to include all structural isomers, linear or branched, of a given structure; for example, all enantiomers and all diasteriomers are included within this definition. As an example, unless otherwise specified, the term propyl is meant to include n-propyl and isopropyl, while the term butyl is meant to include n-butyl, isobutyl, t-butyl, sec-butyl, and so forth. Similarly, substituted alkyl, alkenyl, aryl, and aralkyl groups described herein are intended to include substituted analogs of a given structure. For example, the substituents on alkyl, alkenyl, aryl, and aralkyl groups can include, but are not limited to, halides; hydroxyl groups; amino groups; alkoxy, alkylamino, or dialkylamino groups having up to 10 carbon atoms; or combinations thereof.

Non-limiting examples of alkyl groups which can be present in the at least one carbanion compound include, but are not limited to, methyl, ethyl, propyl, butyl, pentyl, hexyl, heptyl, octyl, nonyl, or decyl, and the like. Examples of alkenyl groups within the scope of the present invention include, but are not limited to, ethenyl, propenyl, butenyl, pentenyl, hexenyl, heptenyl, octenyl, nonenyl, decenyl, and the like. Aryl and aralkyl (aralkyl is defined as an aryl-substituted alkyl or arylalkyl) groups include phenyl, alkyl-substituted phenyl, naphthyl, alkyl-substituted naphthyl, and the like. For example, non-limiting examples of aryl and aralkyl groups useful in the present invention include, but are not limited to, phenyl, tolyl, benzyl, dimethylphenyl, trimethylphenyl, phenylethyl, phenylpropyl, phenylbutyl, propyl-2-phenylethyl, and the like.

In one aspect of the present invention, $R^1$ and $R^2$ are selected independently from a hydrogen atom; a substituted or unsubstituted $C_1$-$C_8$ alkyl, aryl, or aralkyl group; or an oxygen atom. In another aspect, $R^1$ and $R^2$ are selected independently from a hydrogen atom, a methyl group, an ethyl group, a propyl group, a butyl group, a pentyl group, a hexyl group, an ethenyl group, a propenyl group, a butenyl group, a pentenyl group, a hexenyl group, a phenyl group, a tolyl group, a benzyl group, or an oxygen atom.

In accordance with a further aspect of the present invention, $R^3$ is a hydrogen atom, a methyl group, an ethyl group, a propyl group, a butyl group, a pentyl group, a hexyl group, an ethenyl group, a propenyl group, a butenyl group, a pentenyl group, a hexenyl group, a phenyl group, a tolyl group, or a benzyl group. In yet another aspect, $R^4$ is a hydrogen atom, a methyl group, an ethyl group, a propyl group, a butyl group, a pentyl group, a hexyl group, an ethenyl group, a propenyl group, a butenyl group, a pentenyl group, a hexenyl group, a phenyl group, a tolyl group, or a benzyl group.

In another aspect, M is an ion of potassium, sodium, magnesium, or calcium, or a quaternary ammonium ion. In yet another aspect, M is a ion of sodium or potassium. Quaternary ammonium ions useful in the present invention include, but are not limited to, tetramethylammonium, tetraethylammonium, tetrapropylammonium, tetrabutylammonium, trimethyl(2-hydroxypropyl)ammonium, triethyl(2-hydroxypropyl)ammonium, tripropyl(2-hydroxypropyl)ammonium, tributyl(2-hydroxypropyl)ammonium, trimethyl(2-hydroxyethyl)ammonium, triethyl(2-hydroxyethyl)ammonium, tripropyl(2-hydroxyethyl)ammonium, tributyl(2-hydroxyethyl)ammonium, dimethylbenzyl(2-hydroxypropyl)ammonium, or dimethylbenzyl(2-hydroxyethyl)ammonium, and the like, or any combination thereof. In a further aspect of the present invention, M is a tetramethylammonium ion.

The above formula provides for p to be 1 or 2, and q to be 1, 2, or 3. The values of p and q are interrelated and depend upon the selection of the carbanion and/or the ion M. The integers p and q are chosen, therefore, to maintain the charge balance of the carbanion compound.

Suitable carbanion compounds of the present invention include, but are not limited to, sodium acetylacetonate, potassium acetylacetonate, tetramethylammonium acetylacetonate, tetraethylammonium acetylacetonate, sodium malonate, potassium malonate, tetramethylammonium malonate, tetraethylammonium malonate, sodium methyl malonate, potassium methyl malonate, tetramethylammonium methyl malonate, tetraethylammonium methyl malonate, sodium dimethyl malonate, potassium dimethyl malonate, tetramethylammonium dimethyl malonate, tetraethylammonium dimethyl malonate, sodium ethyl malonate, potassium ethyl malonate, tetramethylammonium ethyl malonate, tetraethylammonium ethyl malonate, potassium butyl malonate, potassium allyl malonate, potassium benzyl malonate, and the like, or any combination thereof. In another aspect of the present invention, the at least one carbanion compound is sodium acetylacetonate, potassium acetylacetonate, tetramethylammonium acetylacetonate, sodium malonate, potassium malonate, tetramethylammonium malonate, and the like, or any combination thereof.

Polyisocyanates

Polyisocyanates that are useful in the PIR/PUR foam formation process include, but are not limited to, hexamethylene diisocyanate, isophorone diisocyanate, phenylene diisocyante, toluene diisocyanate (TDI), diphenyl methane diisocyanate isomers (MDI), hydrated MDI and 1,5-naphthalene diisocyanate. For example, 2,4-TDI, 2,6-TDI, and mixtures thereof, can be readily employed in the present invention. Other suitable mixtures of diisocyanates include, but are not limited to, those known in the art as crude MDI, or PAPI, which contain 4,4'-diphenylmethane diisocyanate along with other isomeric and analogous higher polyisocyanates. In another aspect of this invention, prepolymers of polyisocyanates comprising a partially pre-reacted mixture of polyisocyanates and polyether or polyester polyol are suitable. In still another aspect, the polyisocyanate comprises MDI, or consists essentially of MDI or mixtures of MDI's.

The catalyst system, compositions, and methods of producing PIR/PUR foam of the present invention can be used to manufacture many types of foam. This catalyst system is useful, for example, in the formation of foam products for rigid and flame retardant applications, which usually require a high Isocyanate Index. As defined previously, Isocyanate Index is the actual amount of polyisocyanate used divided by the theoretically required stoichiometric amount of polyisocyanate required to react with all the active hydrogen in the reaction mixture, multiplied by 100. For purposes of the present invention, Isocyanate Index is represented by the equation: Isocyanate Index=(Eq NCO/Eq of active hydrogen)×100, wherein Eq NCO is the number of NCO functional groups in the polyisocyanate, and Eq of active hydrogen is the number of equivalent active hydrogen atoms.

Foam products which are produced with an Isocyanate Index from about 80 to about 800 are within the scope of this invention. In accordance with other aspects of the present invention, the Isocyanate Index ranges from about 100 to about 700, from about 150 to about 650, from about 200 to about 600, or from about 250 to about 500.

Polyols

Active hydrogen-containing compounds for use with the foregoing polyisocyanates in forming the polyisocyanurate/polyurethane foams of this invention can be any of those organic compounds having at least two hydroxyl groups such as, for example, polyols. Polyols that are typically used in PIR/PUR foam formation processes include polyalkylene ether and polyester polyols. The polyalkylene ether polyol includes the poly(alkyleneoxide) polymers such as poly(ethyleneoxide) and poly(propyleneoxide) polymers and copolymers with terminal hydroxyl groups derived from polyhydric compounds, including diols and triols, These include, but are not limited to, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, and sugars such as sucrose and like low molecular weight polyols.

Amine polyether polyols can be used in the present invention. These can be prepared when an amine such as, for example, ethylenediamine, diethylenetriamine, tolylenediamine, diphenylmethanediamine, or triethanolamine is reacted with ethylene oxide or propylene oxide.

In another aspect of the present invention, a single high molecular weight polyether polyol, or a mixture of high molecular weight polyether polyols, such as mixtures of different multifunctional materials and/or different molecular weight or different chemical composition materials can be used.

In yet another aspect of the present invention, polyester polyols can be used, including those produced when a dicarboxylic acid is reacted with an excess of a diol. Non-limiting examples include adipic acid or phathalic acid or phthalic anhydride reacting with ethylene glycol or butanediol. Polyols useful in the present invention can be produced by reacting a lactone with an excess of a diol, for example, caprolactone reacted with propylene glycol. In a further aspect, active hydrogen-containing compounds such as polyester polyols and polyether polyols, and combinations thereof, are useful in the present invention.

Blowing Agents

Blowing agents that can be used alone or in combination in the PIR/PUR foam formation process include, but are not limited to, water, methylene chloride, acetone, chlorofluorocarbons (CFCs), hydrofluorocarbons (HFCs), hydrochlorofluorocarbons (HCFCs), and hydrocarbons. Non-limiting examples of HFCs include HFC-245fa, HFC-134a, and HFC-365. Illustrative examples of HCFCs include HCFC-141b, HCFC-22, and HCFC-123. Exemplary hydrocarbons include n-pentane, iso-pentane, cyclopentane, and the like, or any combination thereof. In one aspect of the present invention, the blowing agent or mixture of blowing agents comprises at least one hydrocarbon. In another aspect, the blowing agent comprises n-pentane. Yet, in another aspect of the present invention, the blowing agent consists essentially of n-pentane or mixtures of n-pentane with one or more blowing agents.

The amount of blowing agent used can vary based on, for example, the intended use and application of the foam product and the desired foam stiffness and density. In the foam formulation and method for preparing a polyisocyanurate/polyurethane foam of the present invention, the blowing agent is present in amounts from about 10 to about 80 parts by weight per hundred weight parts polyol (pphp), from about 12 to about 60 pphp, from about 14 to about 40 pphp, or from about 16 to about 25 pphp. If water is present in the formulation, for use as a blowing agent or otherwise, water is present in amounts up to about 15 pphp. In other words, water can range from 0 to about 15 pphp. In another aspect, water can range from 0 to about 10 pphp, from 0 to about 8 pphp, from 0 to about 6 pphp, or from 0 to about 4 pphp.

Urethane Catalyst

Urethane catalysts accelerate the reaction to form polyurethanes, and can be used as a further component of the catalyst systems and compositions of the present invention to produce polyisocyanurate/polyurethane foam. Urethane catalysts suitable for use herein include, but are not limited to, metal salt catalysts, organometallic compounds, amine compounds, or combinations thereof. Non-limiting metal salt catalysts and organometallic compounds include organotins, organobismuths, tin salts, bismuth salts, and the like, or any combination thereof. Amine compounds include, but are not limited to, triethylenediamine (TEDA), N-methylimidazole, 1,2-dimethyl-imidazole, N-methylmorpholine (commercially available as the DABCO® NMM catalyst), N-ethylmorpholine (commercially available as the DABCO® NEM catalyst), triethylamine (commercially available as the DABCO® TETN catalyst), N,N'-dimethylpiperazine, 1,3,5-tris(dimethylaminopropyl)hexahydrotriazine (commercially available as the Polycat® 41 catalyst), 2,4,6-tris(dimethylaminomethyl)phenol (commercially available as the DABCO TMR® 30 catalyst), N-methyldicyclohexylamine (commercially available as the Polycat® 12 catalyst), pentamethyldipropylene triamine (commercially available as the Polycat® 77 catalyst), N-methyl-N'-(2-dimethylamino)-ethyl-piperazine, tributylamine, pentamethyldiethylenetriamine (commercially available as the Polycat® 5 catalyst), hexamethyltriethylenetetramine, heptamethyltetraethylenepentamine, dimethylaminocyclohexylamine (commercially available as the Polycat® 8 catalyst), pentamethyldipropylenetriamine, triethanolamine, dimethylethanolamine, bis(dimethylaminoethyl)ether (commercially available as the DABCO® BL19 catalyst), tris(3-dimethylamino)-propylamine (commercially available as the Polycat® 9 catalyst), 1,8-diazabicyclo[5.4.0]undecene (commercially available as the DABCO® DBU catalyst) or its acid blocked derivatives, and the like, as well as any mixture thereof. Particularly useful as a urethane catalyst for foam applications related to the present invention is the Polycat® 5 catalyst, which is known chemically as pentamethyldiethylenetriamine.

For preparing a polyisocyanurate/polyurethane foam of the present invention, the urethane catalyst can be present in the formulation from 0 to about 10 pphp, from 0 to about 8 pphp, from 0 to about 6 pphp, from 0 to about 4 pphp, from 0 to about 2 pphp, or from 0 to about 1 pphp. In another aspect, the urethane catalyst is present from 0 to about 0.8 pphp, from 0 to about 0.6 pphp, from 0 to about 0.4 pphp, or from 0 to about 0.2 pphp.

Miscellaneous Additives

Depending on the requirements during foam manufacturing or for the end-use application of the foam product, various additives can be employed in the PIR/PUR foam formulation to tailor specific properties. These include, but are not limited to, cell stabilizers, flame retardants, chain extenders, epoxy resins, acrylic resins, fillers, pigments, or any combination thereof. It is understood that other mixtures or materials that are known in the art can be included in the catalyst compositions or foam formulations and are within the scope of the present invention.

Cell stabilizers include surfactants such as organopolysiloxanes. Silicon surfactants can be present in the foam formulation in amounts from about 0.5 to about 10 pphp, about 0.6 to about 9 pphp, about 0.7 to about 8 pphp, about 0.8 to about 7 pphp, about 0.9 to about 6 pphp, about 1 to about 5 pphp, or about 1.1 to about 4 pphp. Useful flame retardants include halogenated organophosphorous compounds and non-halogenated compounds. A non-limiting example of a halogenated flame retardant is trichloropropylphosphate (TCPP). For example, triethylphosphate ester (TEP) and DMMP are non-halogenated flame retardants. Depending on the end-use foam application, flame retardants can be present in the foam formulation in amounts from 0 to about 50 pphp, from 0 to about 40 pphp, from 0 to about 30 pphp, or from 0 to about 20 pphp. In another aspect, the flame retardant is present from 0 to about 15 pphp, 0 to about 10 pphp, 0 to about 7 pphp, or 0 to about 5 pphp. Chain extenders such as ethylene glycol and butane diol can also be employed in the present invention. Ethylene glycol, for instance, can also be present in the formulation as a diluent or solvent for the carbanion catalysts of the present invention.

Polyisocyanurate/Polyurethane Foam Formulation and Process

One aspect of the present invention provides for a novel composition comprising the contact product of at least one active hydrogen-containing compound and a catalyst composition comprising at least one carbanion compound. This novel composition can further comprise at least one urethane catalyst. Likewise, the novel composition can further comprise at least one additive selected from at least one cell stabilizer, at least one flame retardant, at least one chain extender, at least one epoxy resin, at least one acrylic resin, at least one filler, at least one pigment, or any combination thereof.

The present invention provides a method of making a polyisocyanurate/polyurethane (PIR/PUR) foam which comprises contacting at least one polyisocyanate with at least one active hydrogen-containing compound in the presence of at least one blowing agent and a catalytically effective amount of a catalyst composition under conditions sufficient to produce the PIR/PUR foam, the catalyst composition comprising at least one carbanion compound. The conditions sufficient to produce the PIR/PUR foam would be readily known to one of ordinary skill in the art. In accordance with the method of the present invention, PIR/PUR foams can be produced having a density from about 20 Kg/m$^3$ to about 250 Kg/m$^3$ (about 1.25 lb/ft$^3$ to about 15.5 lb/ft$^3$), or from about 24 Kg/m$^3$ to about 60 Kg/m$^3$ (about 1.5 lb/ft$^3$ to about 3.75 lb/ft$^3$).

In another aspect, the method of the present invention offers a substantially consistent foam height rise versus time—even at a high Isocyanate Index—that is beneficial for continuous foam manufacturing operations. The method of making PIR/PUR foams also can provide equivalent or faster surface cure when compared to other commercially available catalyst systems, such that the PIR/PUR foam has enhanced surface adherence, useful for the production of articles such as laminated foam panels.

Optionally, in yet another aspect, the method of the present invention can produce PIR/PUR foams with no or substantially no undesirable amine odor. Dependent upon the selection of the specific at least one carbanion compound, this method can provide thermal stability at the temperatures which PIR/PUR foams normally encounter during manufacturing, even those foams formulated with a high Isocyanate Index. In a further aspect, the method for preparing PIR/PUR foam has thermally stability up to about 150° C., about 160° C., about 170° C., about 180° C., about 190° C., or about 200° C. In a still further aspect, the method of the present invention produces PIR/PUR foam that is substantially free of volatile amines and/or amine odors.

The catalyst composition comprising at least one carbanion compound should be present in the foam formulation in a catalytically effective amount. In one aspect of the PIR/PUR foam formulations of the present invention, a catalytically effective amount of the catalyst composition is from about 0.05 to about 15 parts by weight per hundred weight parts of the at least one active hydrogen-containing compound, excluding the weight contribution of the catalyst system diluent. In another aspect, the catalyst composition is present in amounts from about 0.4 to about 9 parts, or from about 0.8 to about 8 parts, by weight per hundred weight parts of the at least one active hydrogen-containing compound. If the at least one active hydrogen-containing compound is an at least one polyol, the catalyst composition is present in amounts from about 0.05 to about 15 parts by weight per hundred weight parts polyol (pphp). In another aspect, the catalyst composition is present in amounts from about 0.2 to about 10 pphp, about 0.4 to about 9 pphp, about 0.6 to about 8.5 pphp, or about 0.8 to about 8 pphp.

In accordance with one aspect of the method of the present invention, the components of the foam formulation are contacted substantially contemporaneously. For example, at least one polyisocyanate, at least one active hydrogen-containing compound, at least one blowing agent and a catalytically effective amount of a catalyst composition comprising at least one carbanion compound, are contacted together. Given the number of components involved in PIR/PUR formulations, there are many different orders of combining the components, and one of skill in the art would realize that varying the order of addition of the components falls within the scope of the present invention. Additionally, the contacting of any of the aforementioned components of the foam formulation can occur in the presence of at least one urethane catalyst. For example, one aspect of the method of making PIR/PUR foams provides for contacting the at least one polyisocyanate with the at least one active hydrogen-containing compound in the presence of the at least one blowing agent, a catalytically effective amount of the catalyst composition, and the at least one urethane catalyst. Likewise, another aspect of the method of making PIR/PUR foams provides for contacting the at least one polyisocyanate with the at least one active hydrogen-containing compound in the presence of the at least one blowing agent, a catalytically effective amount of the catalyst composition, and at least one additive selected from at least one cell stabilizer, at least one flame retardant, at least one chain extender, at least one epoxy resin, at least one acrylic resin, at least one filler, at least one pigment, or any combination thereof. In a further aspect of the present invention, all of the components, including optional components, are contacted substantially contemporaneously.

In another aspect of the present invention, a premix of ingredients other than the at least one polyisocyanate are contacted first, followed by the addition of the at least one polyisocyanate. For example, the at least one active hydrogen-containing compound, the at least one blowing agent, and the catalyst composition of the present invention are contacted initially to form a premix. The premix is then contacted with the at least one polyisocyanate under conditions sufficient to produce PIR/PUR foams in accordance with the method of the present invention. In a further aspect of the present invention, the same method can be employed, wherein the premix further comprises at least one urethane catalyst. That is, the at least one active hydrogen-containing compound, the at least one blowing agent, the catalyst composition, and the at least one urethane catalyst are contacted together to form a premix. Likewise, the premix can further comprise at least one additive selected from at least one cell stabilizer, at least one flame retardant, at least one chain extender, at least one epoxy resin, at least one acrylic resin, at least one filler, at least one pigment, or any combination thereof.

A further aspect of the present invention provides a method for preparing a polyisocyanurate/polyurethane foam comprising (a) forming a premix comprising:
i) at least one polyol;
ii) about 10 to about 80 parts by weight per hundred weight parts of the polyol (pphp) blowing agent;
iii) about 0.5 to about 10 pphp silicon surfactant;
iv) zero to about 15 pphp water;
v) zero to about 50 pphp flame retardant;
vi) zero to about 10 pphp urethane catalyst; and
vii) about 0.05 to about 15 pphp of a catalyst composition comprising at least one carbanion compound; and
(b) contacting the premix with at least one polyisocyanate at an Isocyanate Index from about 80 to about 800.

As indicated previously, the at least one carbanion compound has the formula:

wherein:
$R^1$ and $R^2$ in each occurrence are selected independently from a hydrogen atom; a substituted or unsubstituted $C_1$-$C_{36}$ alkyl, alkenyl, aryl, or aralkyl group; an oxygen atom; —$OR^4$; or —$NHR^4$;
$R^3$ and $R^4$ in each occurrence are selected independently from a hydrogen atom or a substituted or unsubstituted $C_1$-$C_{36}$ alkyl, alkenyl, aryl, or aralkyl group;
M in each occurrence is selected independently from:
(i) an alkali metal ion,
(ii) an alkaline earth metal ion,
(iii) a zinc ion, or
(iii) a quaternary ammonium ion;
p is 1 or 2; and
q is 1, 2, or 3.

EXAMPLES

The foams of examples 1-3 were produced by adding a catalyst of the present invention into a premix of a polyol, flame retardant (TCPP), surfactant, urethane catalyst (Polycat® 5 catalyst), and blowing agent (n-pentane), in a 32-oz (951 ml) metal cup. This composition was mixed for about 10 seconds (s) at about 6,000 RPM using an overhead stirrer fitted with a 2-inch (5.1 cm) diameter stirring paddle. Sufficient isocyanate (crude MDI) was then added to achieve the desired Isocyanate Index, and the formulation was mixed well for about 6 seconds (s) at about 6,000 RPM using the same stirrer. The 32-oz cup was dropped through a hole in the bottom of a 128-oz (3804 ml) paper cup on a stand. The hole was sized appropriately to catch the lip of the 32-oz cup. The total volume of the foam container was about 160 oz (4755 ml). Foams approximated this volume at the end of the foam forming reaction. Foam height over time was recorded. String gel time and tack free time were measured manually with a wooden stick (e.g., tongue depressor or popsicle stick) and chronometer. Start time and rise time were determined with automated rate of rise equipment.

In examples 1-3, various types and quantities of catalysts were used to produce PIR/PUR foams of the present invention. Although the amounts of each catalyst are not the same in these examples, the respective catalyst quantities were chosen to provide similar string gel times. PIR/PUR foam properties are typically compared at equivalent string gel times. In these examples, unless otherwise specified, the pphp values listed for the carbanion catalysts exclude the additional weight of the diluent. Table I lists the components of the foam formulation and their respective pphp that were used in these examples.

TABLE I

Formulations of Foams in Examples 1-3 (catalyst varied)

| COMPONENT | PARTS (weight) |
|---|---|
| Polyester Polyol | 100 |
| TCPP | 4.7 |
| Surfactant | 1.7 |
| Polycat ® 5 catalyst | 0.15 |
| n-Pentane | 17 |
| Trimer Catalyst | Varied |
| Isocyanate Index | Varied (250-500) |

Inventive Example 1

Comparison of a Tetramethylammonium Acetylacetonate Catalyst with Standard Catalysts at an Isocyanate Index of about 270

Carbanion catalyst 1 was prepared by dissolving acetylacetonate in ethylene glycol, followed by neutralization by the addition of an equivalent amount of an approximate 25% solution of tetramethylammonium hydroxide in methanol. After neutralization, the water and methanol were removed by vacuum distillation. The resulting approximate 50% solution of tetramethylammonium acetylacetonate (about 1.25 pphp or about 1.25 grams excluding diluent) in ethylene glycol constituted inventive catalyst 1. Foams were made using the standard formulation in Table I at an Isocyanate Index of about 270.

Catalyst 1 was compared with two commercial standard catalyst solutions, the DABCO® K15 catalyst (70% potassium octoate solution) and the DABCO TMR® catalyst (75% 2-hydroxypropyltrimethylammonium octoate solution). Approximately 2.1 pphp of the DABCO® K15 catalyst were used; excluding diluent, this converts to about 1.5 pphp or about 1.5 grams of potassium octoate. Approximately 2.9 pphp of the DABCO TMR® catalyst were used; excluding diluent, this converts to about 2.2 pphp or about 2.2 grams of 2-hydroxypropyltrimethylammonium octoate.

Table II shows foam parameters such as start time, string gel time, rise time, and tack free time, for inventive catalyst 1 and the standard catalysts. The string gel times for inventive catalyst 1, the DABCO® K15 catalyst, and the DABCO TMR® catalyst were similar. Foam produced using catalyst 1 had a much shorter tack free time than foam produced using the DABCO® K15 catalyst. As such, catalyst 1 can produce foam with a faster surface cure, less surface friability, and subsequently, better adhesion performance in laminated foam structures, as compared to the DABCO® K15 catalyst. Catalyst 1 provided a slightly higher tack free time than the DABCO TMR® catalyst, suggesting slightly slower surface cure as compared to the DABCO TMR® catalyst. The DABCO TMR® catalyst, however, can be thermally unstable at the elevated temperatures often encountered during PIR/PUR foam processing, decomposing into volatile amine by-products. In contrast, inventive catalyst 1 produced PIR/PUR foam which was substantially free of volatile amines and amine odors.

Figure 1:
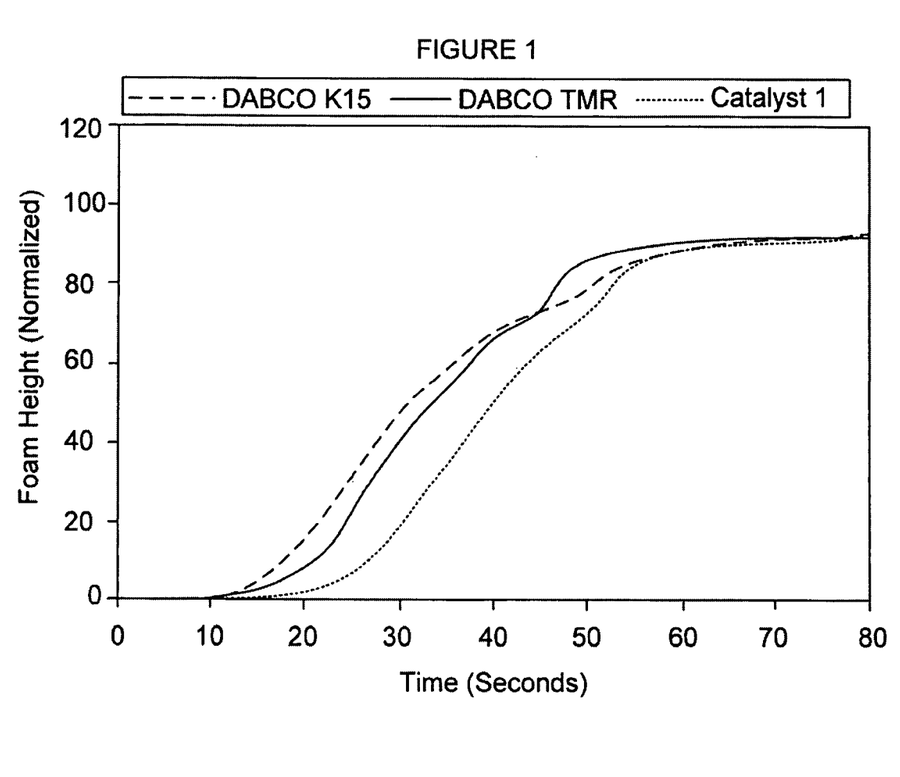
FIG. 1 presents a plot of the normalized foam height versus time for catalyst 1, the DABCO® K15 catalyst, and the DABCO TMR® catalyst, at an Isocyanate Index of about 270.

FIG. 1 compares the foam height versus time for inventive catalyst 1, the DABCO® K15 catalyst, and the DABCO TMR® catalyst. The normalized foam height for catalyst 1 has a more uniform slope and less pronounced plateau as compared to the that of the DABCO® K15 catalyst. This translates to a more consistent foam height rise and is a processing improvement relative to the DABCO® K15 catalyst. The foam height versus time profile of catalyst 1 is very similar to that of the DABCO TMR® catalyst (2-hydroxylpropyltrimethylammonium octoate), suggesting similar foam processing performance.

Figure 2:
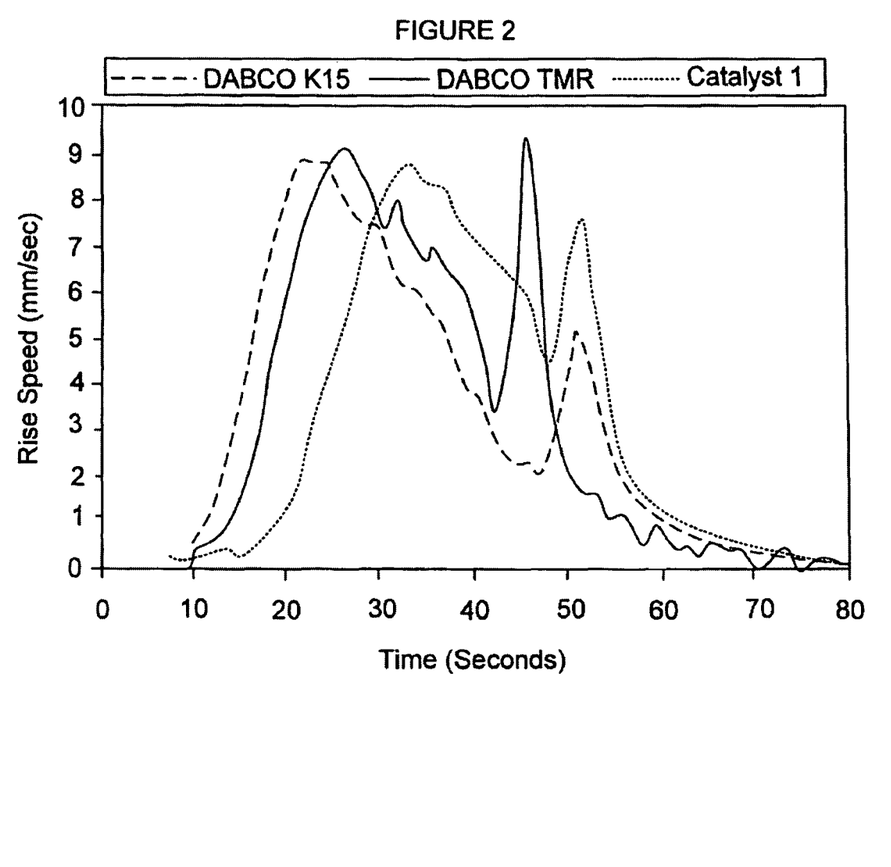
FIG. 2 presents a plot of the rate of foam rise speed versus time for catalyst 1, the DABCO® K15 catalyst, and the DABCO TMR® catalyst, at an Isocyanate Index of about 270.

FIG. 2 illustrates that inventive catalyst 1 has a smaller trimerization "step" as compared to that of potassium octoate (the DABCO® K15 catalyst). The DABCO® K15 catalyst has a long valley in between the two peaks, indicating the different foam rise speeds associated with foam production using this catalyst. Catalyst 1 represents an improvement over the DABCO® K15 catalyst in this regard. Both catalyst 1 and the DABCO TMR® catalyst have a short valley between the peaks; this short valley is indicative of a less significant trimerization step and a more consistent foam rise speed throughout foam production.

Inventive Example 2

Comparison of a Potassium Acetylacetonate Catalyst with Standard Catalysts at an Isocyanate Index of about 270

Carbanion catalyst 2 was prepared by dissolving potassium hydroxide in ethylene glycol, followed by neutralization by the addition of an equivalent amount of acetylacetonate. After neutralization, the water was removed by vacuum distillation. The resulting approximate 50% solution of potassium acetylacetonate (about 1.8 pphp or about 1.8 grams excluding diluent) in ethylene glycol constituted inventive catalyst 2. Foams were made using the standard formulation in Table I at an Isocyanate Index of about 270.

Catalyst 2 was compared with two commercial standard catalyst solutions, the DABCO® K15 catalyst (70% potassium octoate solution) and the DABCO TMR® catalyst (75% 2-hydroxypropyltrimethylammonium octoate solution). Approximately 2.1 pphp of the DABCO® K15 catalyst were used; excluding diluent, this converts to about 1.5 pphp or about 1.5 grams of potassium octoate. Approximately 2.9 pphp of the DABCO TMR® catalyst were used; excluding diluent, this converts to about 2.2 pphp or about 2.2 grams of 2-hydroxypropyltrimethylammonium octoate.

As shown in Table II, at a similar string gel time, inventive catalyst 2 had a tack free time of about 60 seconds, much shorter than that achieved with either the DABCO® K15 catalyst or the DABCO TMR® catalyst. As such, catalyst 2 would produce foam with a faster surface cure, less surface friability, and subsequently, better adhesion performance in laminated foam structures, as compared to either the DABCO® K15 catalyst or the DABCO TMR® catalyst.

Figure 3:
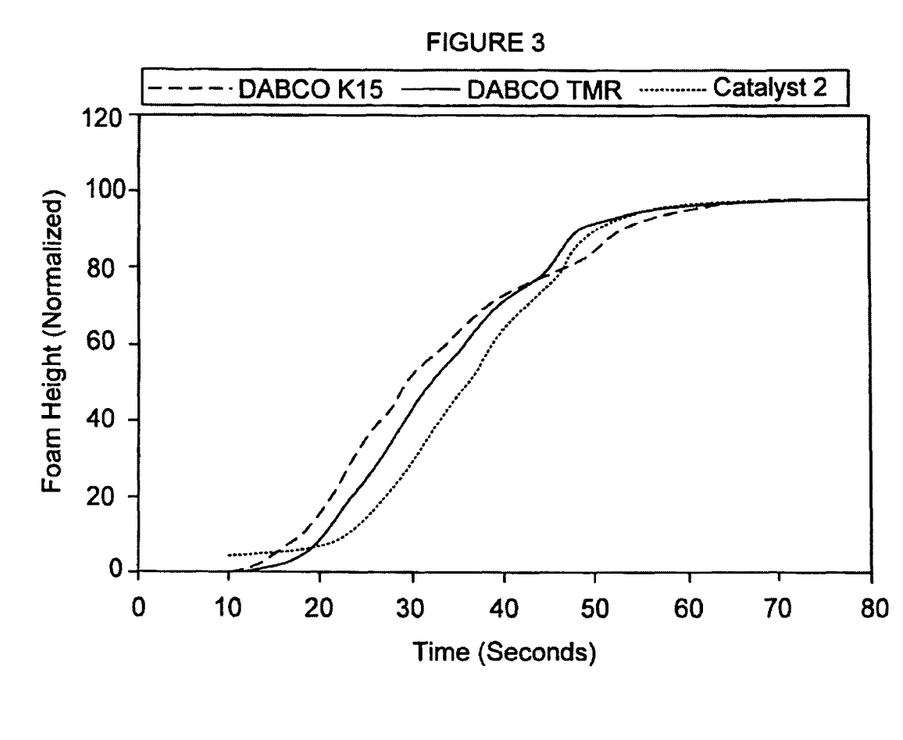
FIG. 3 presents a plot of the normalized foam height versus time for catalyst 2, the DABCO® K15 catalyst, and the DABCO TMR® catalyst, at an Isocyanate Index of about 270.

FIG. 3 compares the foam height versus time for inventive catalyst 2, the DABCO® K15 catalyst, and the DABCO TMR® catalyst. The curve for catalyst 2 has a slope that is more uniform than either that of the DABCO® K15 catalyst or the DABCO TMR® catalyst. Hence, foam produced with inventive catalyst 2 would have the most consistent foam rise or foam expansion speed over time. This is a useful feature for continuous PIR/PUR foam operations, such as those involving lamination processes.

Figure 4:
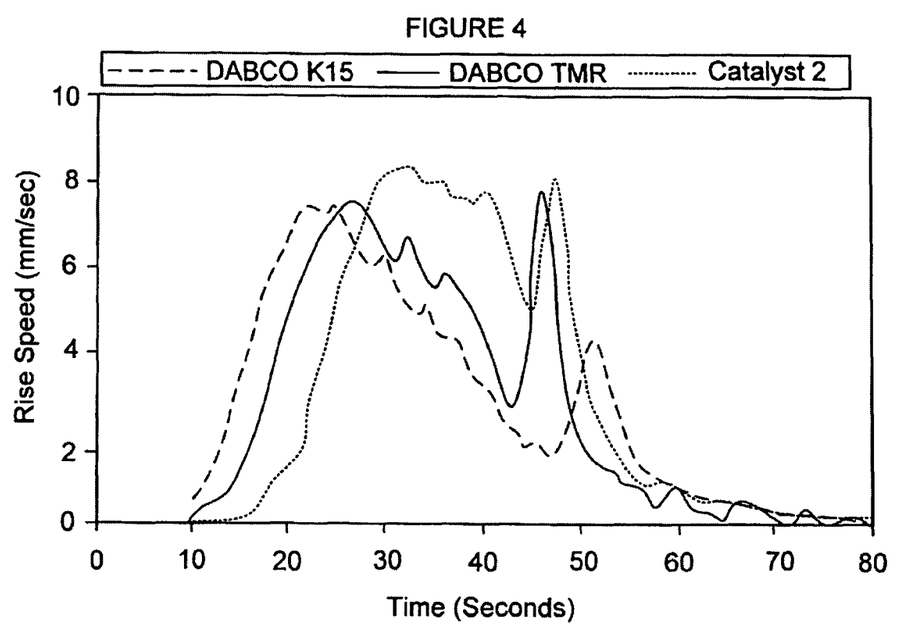
FIG. 4 presents a plot of the rate of foam rise speed versus time for catalyst 2, the DABCO® K15 catalyst, and the DABCO TMR® catalyst, at an Isocyanate Index of about 270.

Further, the smaller trimerization "step" with inventive catalyst 2 is illustrated by both the short and the shallow valley between the two peaks in FIG. 4. Catalyst 2 offers the most consistent foam rise speed over time, even better than that of the DABCO TMR® catalyst. This feature is beneficial in PIR/PUR foam production operations.

TABLE II

Foam comparison of catalysts 1 and 2 to standard catalysts at an Isocyanate Index of about 270.

| Catalyst | Start Time [s] | String Gel Time [s] | Rise Time [s] | Tack Free Time [s] |
|---|---|---|---|---|
| [a]2.1 pphp DABCO ® K15 | 14 | 54 | 72 | 108 |
| [b]2.9 pphp DABCO TMR ® | 16 | 49 | 65 | 77 |
| [c]1.25 pphp Catalyst 1 | 20 | 52 | 70 | 87 |
| [c]1.8 pphp Catalyst 2 | 20 | 47 | 70 | 60 |

Notes:
[a]2.1 pphp DABCO ® K15 catalyst including diluent converts to about 1.5 pphp of potassium octoate salt catalyst excluding diluent.
[b]2.9 pphp DABCO TMR ® catalyst including diluent converts to about 2.2 pphp of 2-hydroxypropyltrimethylammonium octoate catalyst excluding diluent.
[c]Catalyst 1 and Catalyst 2 pphp values exclude the diluent.

Inventive Example 3

Comparison of a Potassium Acetylacetonate Catalyst with Standard Catalysts at an Isocyanate Index of about 500

Carbanion catalyst 2 was prepared as disclosed in Example 2. The addition level of catalyst 2 in this example was about 4 pphp or about 4 grams, excluding diluent. Foams were made using the standard formulation in Table I at an Isocyanate Index of about 500.

Catalyst 2 was compared with two commercial standard catalyst solutions, the DABCO® K15 catalyst (70% potassium octoate solution) and the DABCO TMR® catalyst (75% 2-hydroxypropyltrimethylammonium octoate solution). Approximately 4.6 pphp of the DABCO® K15 catalyst were used; excluding diluent, this converts to about 3.2 pphp or about 3.2 grams of potassium octoate. Approximately 4.8 pphp of the DABCO TMR® catalyst were used; excluding diluent, this converts to about 3.6 pphp or about 3.6 grams of 2-hydroxypropyltrimethylammonium octoate.

Table III shows foam parameters such as start time, string gel time, rise time, and tack free time, for inventive catalyst 2 and the standard catalysts at an Isocyanate Index of about 500. Table III illustrates that the string gel time for catalyst 2 could not be matched to that of the DABCO® K15 catalyst and the DABCO TMR® catalyst, even at a higher catalyst addition level, excluding diluent. The resulting tack free time for catalyst 2 was higher than either of the standard catalysts. Hence, catalyst 2 can be used to produce quality PIR/PUR foam, but it is not as catalytically active as the standard catalysts at this specific Isocyanate Index and foam formulation.

Figure 5:
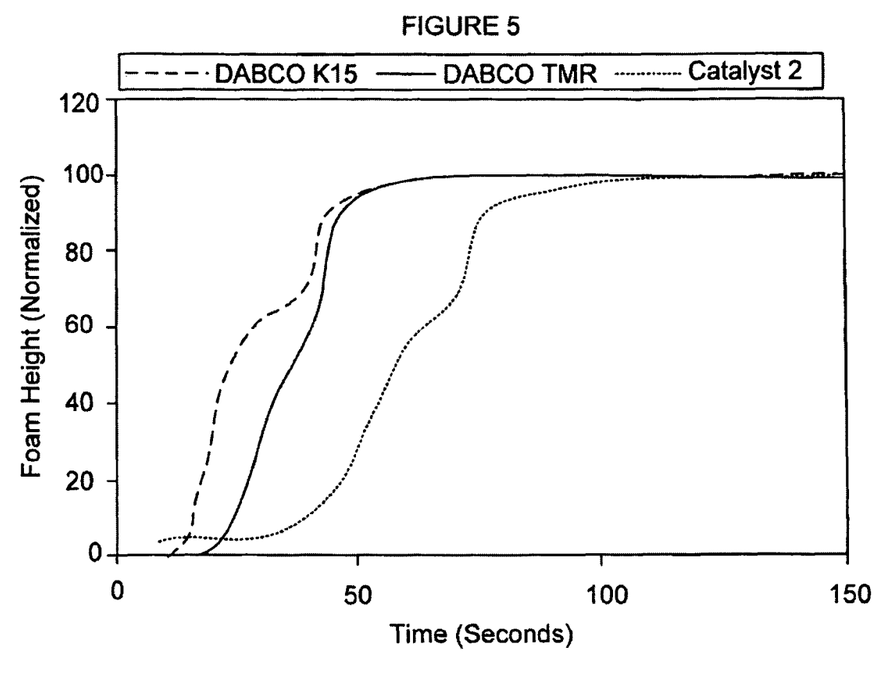
FIG. 5 presents a plot of the normalized foam height versus time for catalyst 2, the DABCO® K15 catalyst, and the DABCO TMR® catalyst, at an Isocyanate Index of about 500.

At an Isocyanate Index of about 500, FIG. 5 compares the foam height versus time for inventive catalyst 2, the DABCO®K15 catalyst, and the DABCO TMR® catalyst. The catalyst 2 curve has a slope that is more uniform than that of the DABCO® K15 catalyst and comparable to that of the DABCO TMR® catalyst. Hence, foam produced with inventive catalyst 2 would have a more consistent foam rise or foam expansion speed over time as compared to the DABCO® K15 catalyst, and comparable to the DABCO TMR® catalyst. The DABCO TMR® catalyst, however, can give rise to amine odors during PIR/PUR foam processing. In contrast, inventive catalyst 2 produced PIR/PUR foam which was substantially free of volatile amines and amine odors.

Figure 6:
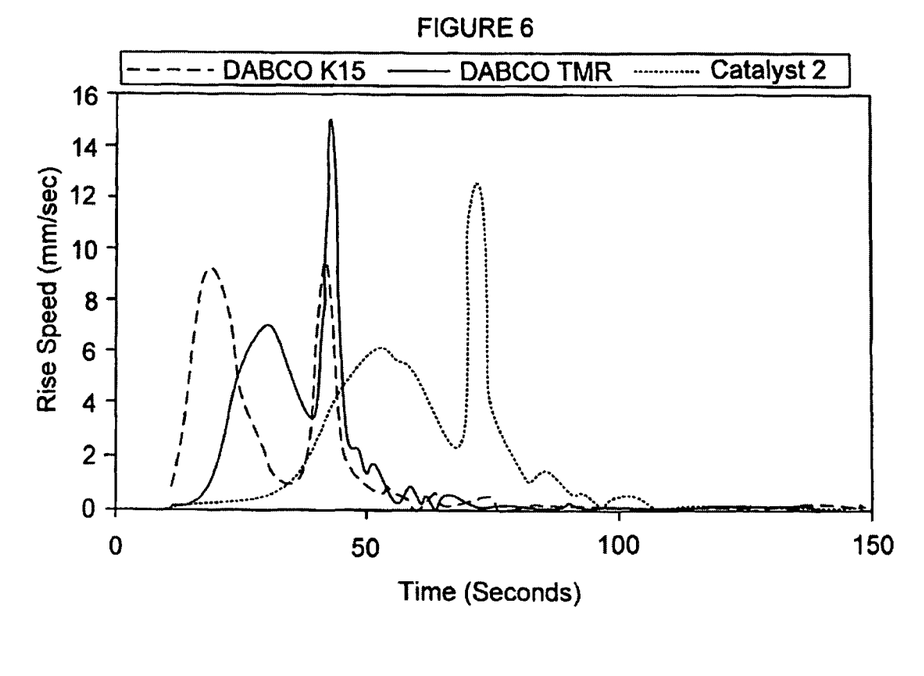
FIG. 6 presents a plot of the rate of foam rise speed versus time for catalyst 2, the DABCO® K15 catalyst, and the DABCO TMR® catalyst, at an Isocyanate Index of about 500.

FIG. 6 illustrates that inventive catalyst 2 has a smaller trimerization "step" as compared to that of potassium octoate (the DABCO® K15 catalyst). The DABCO® K15 catalyst has a long valley in between two sharp peaks, indicating the different foam rise speeds associated with foam production using this catalyst. Catalyst 2 represents an improvement over the DABCO® K15 catalyst in this regard. Both catalyst 2 and the DABCO TMR® catalyst have a short valley between the peaks; this short valley is indicative of a less significant trimerization step and a more consistent foam rise speed throughout foam production. Hence, although catalyst 2 is not as catalytically active as the two commercial standards in this particular foam formulation, catalyst 2 can still produce quality foam with a foam height rise profile similar to the DABCO TMR® catalyst and superior to that of the DABCO® K15 catalyst.

TABLE III

Foam comparison of catalyst 2 to standard catalysts at an Isocyanate Index of about 500.

| Catalyst | Start Time [s] | String Gel Time [s] | Rise Time [s] | Tack Free Time [s] |
|---|---|---|---|---|
| [a]4.6 pphp DABCO ® K15 | 13 | 44 | 61 | 61 |
| [b]4.8 pphp DABCO TMR ® | 20 | 44 | 50 | 60 |
| [c]4 pphp Catalyst 2 | 34 | 73 | 95 | 85 |

Notes:
[a]4.6 pphp DABCO ® K15 catalyst including diluent converts to about 3.2 pphp of potassium octoate salt catalyst excluding diluent.
[b]4.8 pphp DABCO TMR ® catalyst including diluent converts to about 3.6 pphp of 2-hydroxypropyltrimethylammonium octoate catalyst excluding diluent.
[c]Catalyst 2 pphp value excludes the diluent.

We claim:

1. A method of producing an isocyanurate comprising:
providing at least one isocyanate,
contacting the isocyanate with a catalyst composition comprising at least one carbanion compound having the formula:

wherein $R^1$ and $R^2$ in each occurrence are selected independently from a hydrogen atom; a substituted or unsubstituted $C_1$-$C_{36}$ alkyl, alkenyl, aryl, or aralkyl group; an oxygen atom; —$OR^4$; or —$NHR^4$;
wherein $R^3$ and $R^4$ in each occurrence are selected independently from a hydrogen atom or a substituted or unsubstituted $C_1$-$C_{36}$ alkyl, alkenyl, aryl, or aralkyl group;
wherein M in each occurrence is selected independently from:
potassium or a quaternary ammonium ion;
wherein p is 1 or 2; and
wherein q is 1, 2, or 3;
under conditions sufficient to produce the isocyanurate.

2. A method of making a polyisocyanurate/polyurethane (PIR/PUR) foam comprising:
providing at least one polyisocyanate,
contacting the at least one polyisocyanate with at least one active hydrogen-containing compound in the presence of at least one blowing agent and a catalytically effective amount of a catalyst composition under conditions sufficient to produce the PIR/PUR foam, the catalyst composition comprising at least one carbanion compound having the formula:

wherein $R^1$ and $R^2$ in each occurrence are selected independently from a hydrogen atom; a substituted or unsubstituted $C_1$-$C_{36}$ alkyl, alkenyl, aryl, or aralkyl group; an oxygen atom; —$OR^4$; or —$NHR^4$;
wherein $R^3$ and $R^4$ in each occurrence are selected independently from a hydrogen atom or a substituted or unsubstituted $C_1$-$C_{36}$ alkyl, alkenyl, aryl, or aralkyl group;
wherein M in each occurrence is selected independently from:
potassium or a quaternary ammonium ion;
wherein p is 1 or 2; and
wherein q is 1, 2, or 3.

3. The method of claim 2, wherein the at least carbanion compound is potassium acetylacetonate, tetramethylammonium acetylacetonate, tetraethylammonium acetylacetonate, potassium malonate, tetramethylammonium malonate, tetraethylammonium malonate, potassium methyl malonate, tetramethylammonium methyl malonate, tetraethylammonium methyl malonate, potassium dimethyl malonate, tetramethylammonium dimethyl malonate, tetraethylammonium dimethyl malonate, potassium ethyl malonate, tetramethylammonium ethyl malonate, tetraethylammonium ethyl malonate, potassium butyl malonate, potassium allyl malonate, potassium benzyl malonate, or any combination thereof.

4. The method of claim 2, wherein the contacting of the at least one polyisocyanate with the at least one active hydrogen-containing compound occurs in the presence of at least one urethane catalyst.

5. The method of claim 2, wherein the contacting of the at least one polyisocyanate with the at least one active hydrogen-containing compound occurs in the presence of at least one additive selected from at least one cell stabilizer, at least one flame retardant, at least one chain extender, at least one epoxy resin, at least one acrylic resin, at least one filler, at least one pigment, or any combination thereof.

6. The method of claim 2, wherein the at least one polyisocyanate comprises diphenyl methane diisocyanate.

7. The method of claim 2, wherein the at least one active hydrogen-containing compound is at least one polyether polyol, at least one polyester polyol, or any combination thereof.

8. The method of claim 2, wherein the at least one blowing agent is water, methylene chloride, acetone, a chlorofluorocarbon, a hydrofluorocarbon, a hydrochlorofluorocarbon, a hydrocarbon, or any combination thereof.

9. The method of claim 8, wherein the at least one blowing agent is n-pentane, iso-pentane, cyclopentane, or any combination thereof.

10. The method of claim 2, wherein the catalyst composition is present in an amount from about 0.05 to about 15 parts by weight per hundred weight parts of the at least one active hydrogen-containing compound.

11. A method for preparing a polyisocyanurate/polyurethane foam comprising
(a) forming a premix comprising:
i) at least one polyol;
ii) about 10 to about 80 parts by weight per hundred weight parts polyol (pphp) blowing agent;
iii) about 0.5 to about 10 pphp silicon surfactant;
iv) zero to about 15 pphp water;
v) zero to about 50 pphp flame retardant;
vi) zero to about 10 pphp urethane catalyst; and
vii) about 0.05 to about 15 pphp of a catalyst composition comprising at least one carbanion compound having the formula:

wherein $R^1$ and $R^2$ in each occurrence are selected independently from a hydrogen atom; a substituted or unsubstituted $C_1$-$C_{36}$ alkyl, alkenyl, aryl, or aralkyl group; an oxygen atom; —$OR^4$; or —$NHR^4$;
wherein $R^3$ and $R^4$ in each occurrence are selected independently from a hydrogen atom or a substituted or unsubstituted $C_1$-$C_{36}$ alkyl, alkenyl, aryl, or aralkyl group;
wherein M in each occurrence is selected independently from:
potassium or quaternary ammonium ion;
wherein p is 1 or 2;
wherein q is 1, 2, or 3; and
(b) contacting the premix with at least one polyisocyanate at an Isocyanate Index from about 80 to about 800.

12. The method of claim 2, wherein $R^1$ and $R^2$ are selected independently from a hydrogen atom; a substituted or unsubstituted $C_1$-$C_8$ alkyl, aryl, or aralkyl group; or an oxygen atom.

13. The method of claim 2, wherein $R^1$ and $R^2$ are selected independently from a hydrogen atom, a methyl group, an ethyl group, a propyl group, a butyl group, a pentyl group, a hexyl group, an ethenyl group, a propenyl group, a butenyl group, a pentenyl group, a hexenyl group, a phenyl group, a tolyl group, a benzyl group, or an oxygen atom.

14. The method of claim 2, wherein $R^3$ is a hydrogen atom, a methyl group, an ethyl group, a propyl group, a butyl group, a pentyl group, a hexyl group, an ethenyl group, a propenyl group, a butenyl group, a pentenyl group, a hexenyl group, a phenyl group, a tolyl group, or a benzyl group.

15. The method of claim 2, wherein $R^4$ is a hydrogen atom, a methyl group, an ethyl group, a propyl group, a butyl group, a pentyl group, a hexyl group, an ethenyl group, a propenyl group, a butenyl group, a pentenyl group, a hexenyl group, a phenyl group, a tolyl group, or a benzyl group.

16. The method of claim 2, wherein M is a quaternary ammonium ion.

17. The method of claim 2, wherein M is an ion of potassium.

18. The method of claim 16, wherein the quaternary ammonium ion is tetramethylammonium, tetraethylammonium, tetrapropylammonium, tetrabutylammonium, trimethyl(2-hydroxypropyl)ammonium, triethyl(2-hydroxypropyl)ammonium, tripropyl(2-hydroxypropyl)ammonium, tributyl(2-hydroxypropyl)ammonium, trimethyl(2-hydroxyethyl) ammonium, triethyl(2-hydroxyethyl)ammonium, tripropyl (2-hydroxyethyl) ammonium, tributyl(2-hydroxyethyl)ammonium, dimethylbenzyl(2-hydroxypropyl)ammonium, or dimethylbenzyl(2-hydroxyethyl)ammonium.

19. The method of claim 1 wherein M is a quaternary ammonium ion.

20. The method of claim 1 wherein M is potassium.

21. The method of claim 1 wherein the method is substantially free of volatile amines.

22. The method of claim 11 wherein the method is substantially free of volatile amines.

23. The method of claim 2 wherein the foam is used for producing laminated panels.

24. A method of producing an isocyanurate comprising:
providing at least one isocyante comprising at least of diphenyl methane diisocvanate isomers and toluene diisocyanate,
providing a catalyst composition comprising at least one carbanion compound having the formula:

wherein $R^1$ and $R^2$ in each occurrence are selected independently from a hydrogen atom; a substituted or unsubstituted $C_1$-$C_{36}$ alkyl, alkenyl, aryl, or aralkyl group; an oxygen atom; —$OR^4$; or —$NHR^4$;
wherein $R^3$ and $R^4$ in each occurrence are selected independently from a hydrogen atom or a substituted or unsubstituted $C_1$-$C_{36}$ alkyl, alkenyl, aryl, or aralkyl group;
wherein M in each occurrence is selected independently from:
(i) an alkali metal ion,
(ii) an alkaline earth metal ion, or
(iii) a quaternary ammonium ion;
wherein p is 1 or 2; and
wherein q is 1, 2, or 3;
contacting the catalyst with a solvent, and;
contacting the isocyanate with a solvated catalyst composition.

25. The method of claim 24 wherein the solvent comprises ethylene glycol.

26. The method of claim 25 wherein M is a potassium ion.

27. The method of claim 25 wherein M is a quaternary ammonium ion.

28. The method of claim 1 wherein $R^1$ is a methyl group.

29. The method of claim 1 wherein $R^2$ is a methyl group.

30. The method of claim 1 wherein $R^3$ is H.

* * * * *